United States Patent
Horng et al.

(10) Patent No.: US 6,961,949 B2
(45) Date of Patent: Nov. 1, 2005

(54) DISC CARRIER HAVING A CLAMPING DEVICE FOR USE IN AN OPTICAL DISC DRIVE

(75) Inventors: Alex Horng, Kaohsiung (TW); Yin-Rong Hong, Kaohsiung (TW)

(73) Assignee: Sunonwealth Electric Machine Industry Co., Ltd., Kaohsiung (TW)

(*) Notice: Subject to any disclaimer, the term of this patent is extended or adjusted under 35 U.S.C. 154(b) by 157 days.

(21) Appl. No.: 10/621,515

(22) Filed: Jul. 18, 2003

(65) Prior Publication Data

US 2004/0244025 A1 Dec. 2, 2004

(51) Int. Cl.[7] .................. G11B 17/028; G11B 17/03; G11B 19/20
(52) U.S. Cl. .................................................. 720/695
(58) Field of Search ........................ 720/695, 658, 720/703, 704, 706, 707, 709, 713, 715, 716, 705, 708; 369/270, 270.1, 271.1, 263.1, 258.1, 176

(56) References Cited

U.S. PATENT DOCUMENTS

| | | | | |
|---|---|---|---|---|
| 5,555,233 A | * | 9/1996 | Yano et al. | 720/709 |
| 6,208,613 B1 | * | 3/2001 | Iizuka | 720/707 |
| 2004/0216154 A1 | * | 10/2004 | Kim et al. | 720/707 |

* cited by examiner

*Primary Examiner*—Julie Anne Watko
(74) *Attorney, Agent, or Firm*—Bacon & Thomas, PLLC

(57) ABSTRACT

A disc carrier for an optical disc drive includes a recession integrally formed thereon and an axial tube projecting from a central portion of a bottom wall of the recession. A shaft extends through the axial tube. An engaging length between the axial tube and the shaft is increased to improve rotating stability of the disc carrier. A support member is fixed in the recession and includes a peripheral support edge along a periphery thereof. The support member is in contact with and thus supports plural clamping members of a clamping device.

3 Claims, 4 Drawing Sheets

DISC CARRIER HAVING A CLAMPING DEVICE FOR USE IN AN OPTICAL DISC DRIVE

BACKGROUND OF THE INVENTION

1. Field of the Invention

The present invention relates to a disc carrier for an optical disc drive. In particular, the present invention relates to a disc carrier for an optical disc drive with improved rotating stability.

2. Description of Related Art

FIGS. 1 and 2 of the drawings illustrate an optical disc drive with a conventional disc carrier. The optical disc drive comprises a spindle motor including a disc carrier 10, a clamping device 20, a shaft 30, a stator assembly 40, a bearing seat 50, and a base 60. The disc carrier 10 is a rotor of the spindle motor and includes a hole 101 to which an engaging member 11a is securely mounted. The engaging member 11a includes an axial tube 111a with an axial hole 112a. Plural support blocks 12a are formed, by means of punching, on a top face of the disc carrier 10 for supporting plural clamping members 22 of the clamping device 20. The clamping device 20 includes a central hole 21, plural clamping members 22, and plural elastic elements 23.

An outer periphery of the shaft 30 is tightly fitted to an inner periphery of the axial hole 112a of the axial tube 111a of the engaging member 111a, and the inner periphery of the central hole 21 of the clamping device 20 is tightly fitted around an outer periphery of the axial tube 111a of the engaging member 11a. The disc carrier 10 and the clamping device 20 are coupled by the shaft 30 to the stator assembly 40, the bearing seat 50, and the base 60 to thereby form a spindle motor for an optical disc drive. An optical disc can be releasably clamped by the clamping members 22 of the clamping device 20, and the data stored in the optical disc can be read through stable rotation of the disc carrier.

In the industry, the engaging member 11a is widely used to assist in assembly of the disc carrier 10 with the claiming device 20 and the shaft 30. However, it was found that the engaging member 11a was apt to incline relative to the disc carrier 10 and thus caused imbalance. Further, the engaging length between the axial tube 111a of the engaging member 11a and the shaft 30 is insufficient to provide reliable balanced rotation of the disc carrier 10 when the shaft 30 turns. Further, formation of the hole 101 of the disc carrier 10 and the assembling procedure of mounting the engaging member 11a to the hole 101 of the disc carrier 10 increase the overall manufacture time. Further, the assembling procedure is complicated, as alignment of the clamping members 22 of the clamping device 20 with the support blocks 12a of the disc carrier 10 is required.

OBJECTS OF THE INVENTION

An object of the present invention is to provide a disc carrier for an optical disc drive with improved rotating stability.

Another object of the present invention is to provide a disc carrier for an optical disc drive that allows easy, rapid assembly with a clamping device.

SUMMARY OF THE INVENTION

To achieve the aforementioned objects, the present invention provides a disc carrier for an optical disc drive, wherein the disc carrier includes a recession integrally formed on the disc carrier and an axial tube projecting from a central portion of a bottom wall of the recession.

A shaft extends through the axial tube that is longer than the conventional design. An engaging length between the axial tube and the shaft is increased to improve rotating stability of the disc carrier.

In an embodiment of the invention, a support member is fixed in the recession and includes a peripheral support edge along a periphery thereof. The support member is in contact with and thus supports plural clamping members of a clamping device. The support member includes a central hole through which the axial tube of the disc carrier extends. The support member further includes an annular groove between the central hole and the peripheral support edge of the support member, allowing stable movement of the plural clamping members of the clamping device. The peripheral support edge of the support member includes an inclined face that faces radially inward. Each clamping member of the clamping device includes an inclined face in contact with the inclined face of the peripheral support edge, allowing the clamping members of the clamping device to slide relative to the support member along the inclined face of the peripheral support edge of the support member.

Other objects, advantages and novel features of this invention will become more apparent from the following detailed description when taken in conjunction with the accompanying drawings.

DETAILED DESCRIPTION OF THE PREFERRED EMBODIMENT

Figure 1:
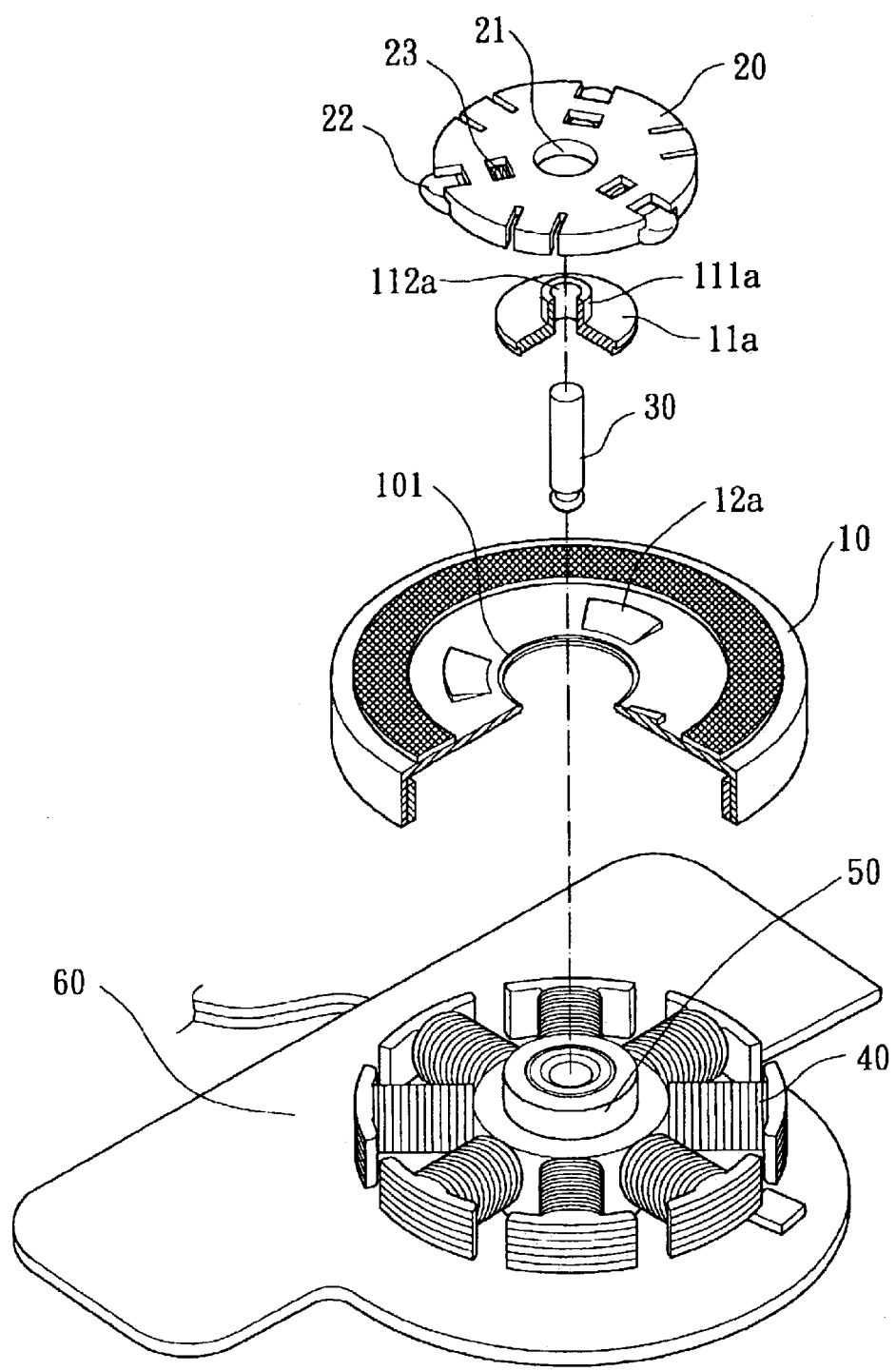
FIG. 1 is an exploded perspective view of an optical disc drive with a conventional disc carrier.

A preferred embodiment of the present invention is now to be described hereinafter in detail, in which the same reference numerals are used in the preferred embodiments for the same parts as those in the prior art to avoid redundant description.

Figure 2:
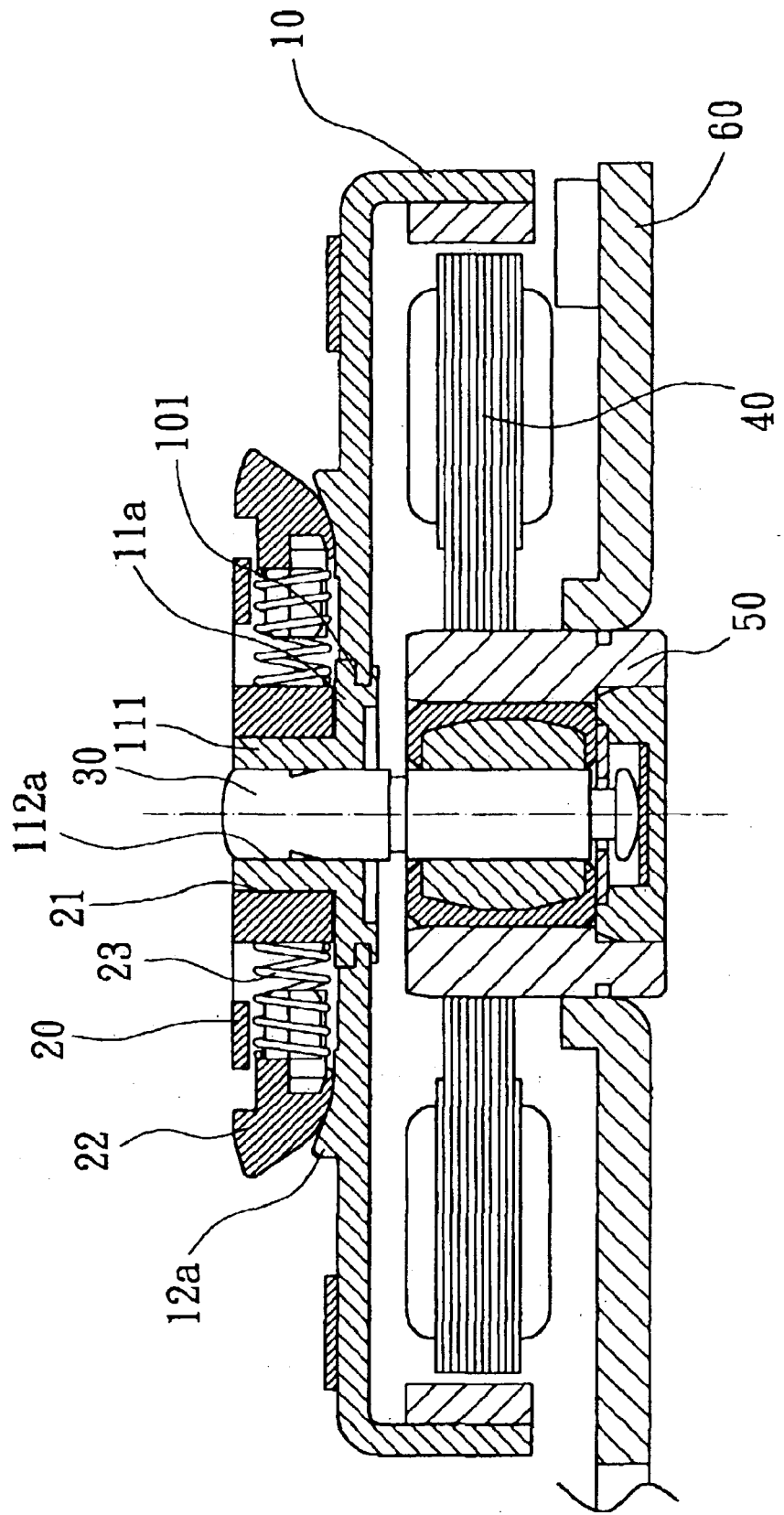
FIG. 2 is a sectional view of the optical disc drive in FIG. 1.
Figure 3:
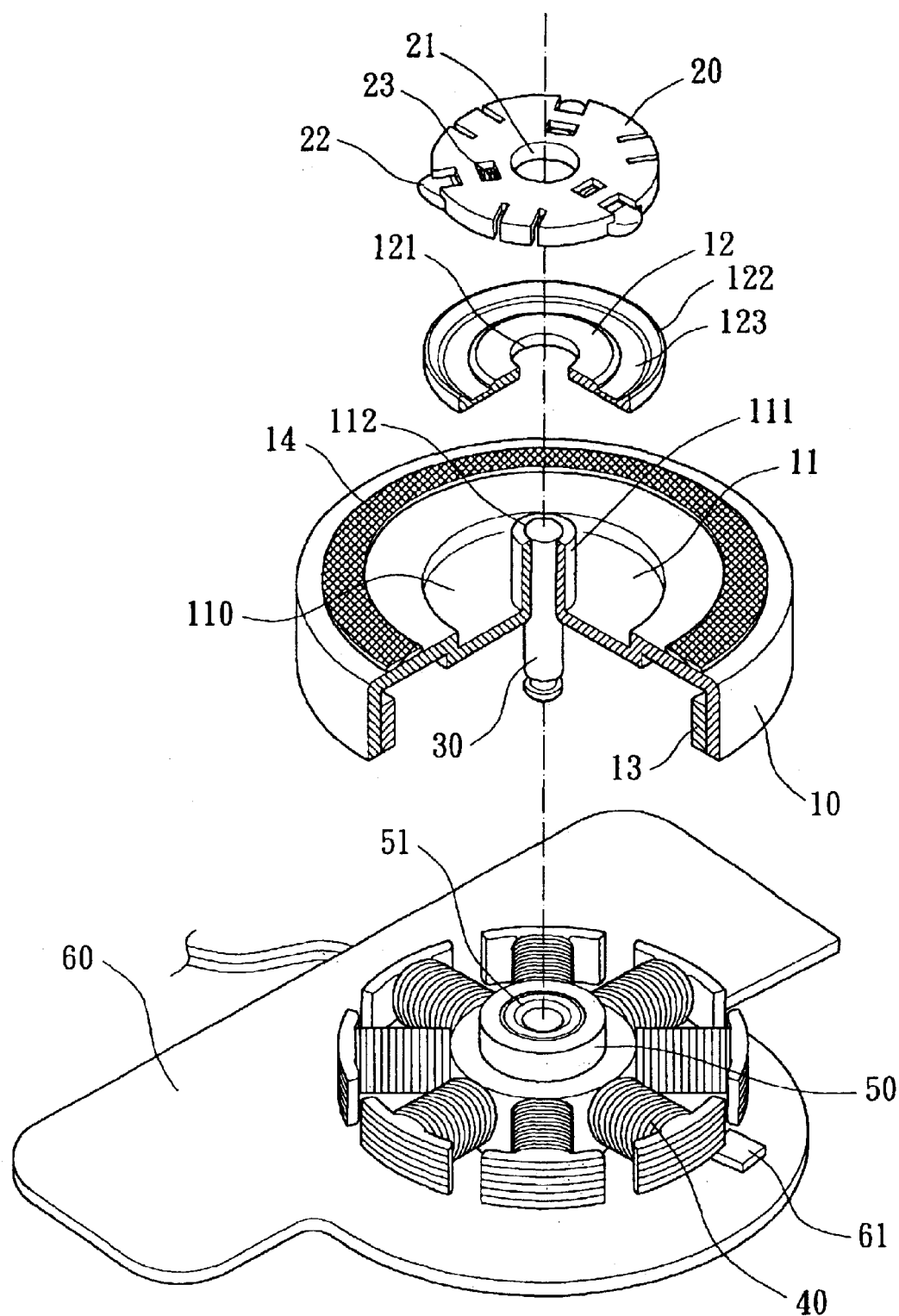
FIG. 3 is an exploded perspective view of an optical disc drive with a disc carrier in accordance with the present invention.
Figure 4:
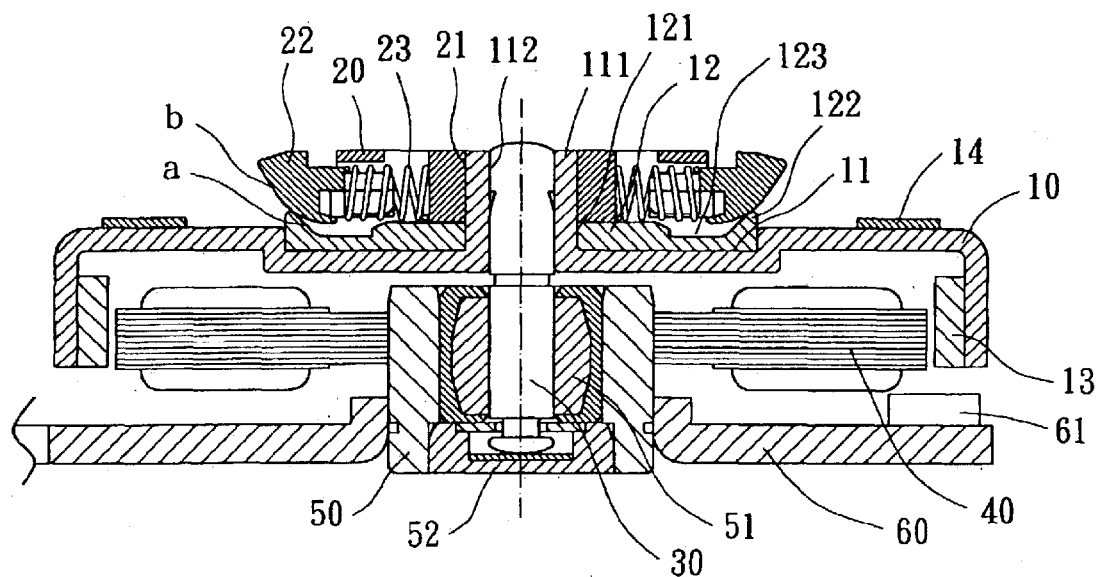
FIG. 4 is a sectional view of the optical disc drive in FIG. 3.

Referring to FIGS. 3 and 4, a disc carrier 10 in accordance with the present invention is generally a rotor of a spindle motor and includes a recession 11 in a top side thereof, an axial tube 111, and a support member 12. The recession 11 is integrally formed on the disc carrier 10 by means of punching, casting, etc. The axial tube 111 projects from a central portion of a bottom wall 110 of the recession 11 and extends along a longitudinal axis to a level the same as that of the conventional design. Thus, the axial tube 111 is longer than the axial tube 11a in FIGS. 1 and 2, as the axial tube 111 extends from a point lower than the axial tube 11a of the conventional design. The support member 12 is made of plastic or metal and fixedly mounted in the recession 11 by means of tight fitting or gluing. The support member 12 includes a central hole 121, a peripheral support edge 122, and an annular groove 123. The support member 12 is engaged to the axial tube 111 by the central hole 121. The peripheral support edge 122 is formed along a periphery of the support member 12 and includes an inclined face "a" that faces radially inward. The annular groove 123 is formed between the central hole 121 and the peripheral support edge 122 of the support member 12.

Figure 5:
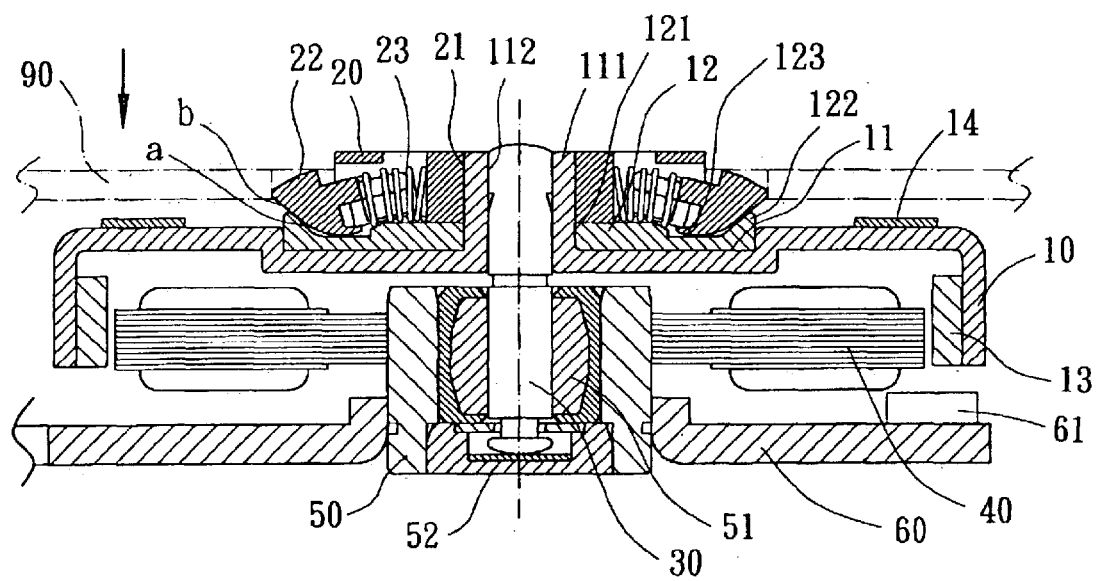
FIG. 5 is a sectional view similar to FIG. 4, illustrating use of the optical disc drive.

Still referring to FIGS. 3 and 4, a clamping device 20 is mounted to the disc carrier 10 and includes a central hole 21, plural clamping members 22, and plural elastic elements 23. The clamping device 20 is made of plastic and tightly fitted by the central hole 21 to the axial tube 111 of the disc carrier 10 at a position above the support member 12. The respective clamping member 22 includes an inclined face "b" in contact with the inclined face "a" of the support member 12. The elastic elements 23 allow retraction of the clamping members 22 to allow passage of an optical disc 90 (FIG. 5), and the clamping members 22 return to their original position to thereby retain the optical disc 90 on the disc carrier 10. During compression and return travel of the elastic elements 23, the inclined face "a" of the support member 12 provide a support for the inclined face "b" of the respective clamping member 22, while the annular groove 123 of the support member 12 allows stable reciprocal movement of the respective clamping member 22 (c.f. the support blocks 12a in FIGS. 1 and 2).

Still referring to FIGS. 3 and 4, the disc carrier 10, the clamping device 20, and the support member 12 may be assembled with a stator assembly 40, a bearing seat 50, and a base 60 to form a spindle motor for an optical disc drive. The inner periphery of the axial tube 111 of the disc carrier 10 is tightly engaged with the shaft 30. The bearing seat 50 includes a bearing 51 through which the shaft 30 is rotatably extended. The stator assembly 40 is mounted around the bearing seat 50 and generates alternating magnetic fields when energized. The bearing seat 50 is fixed to the base 60 on which a sensor 61 is mounted for detecting a change in polarity of a ring magnet 13 on the disc carrier 10. Further, a padding member 14 may be mounted on the disc carrier 10 for supporting the optical disc 90 and for absorbing vibrations of the optical disc 90.

Since the recession 11 is integrally formed on the disc carrier 10, the engaging length between the axial tube 111 of the disc carrier 10 and the shaft 30 is longer than the conventional design. Thus, when the disc carrier 10 turns together with the shaft 30, the relatively longer axial tube 111 allows the disc carrier 10 to turn in a balanced manner, thereby improving the rotating stability of the disc carrier 10. Further, the assembling procedure of the disc carrier 10, the support member 12, and the clamping device 20 is easier, as the peripheral support edge 122 of the support member 12 provides a reliable support for the clamping members 22 of the clamping device 20 regardless of the angular position of the respective clamping member 22. Thus, the clamping device 20 can be directly mounted to the disc carrier 10 without the need of aligning the respective clamping member 22 of the clamping device 20 with the peripheral support edge 122 of the support member 12. The assembling procedure is thus simplified.

While the principles of this invention have been disclosed in connection with its specific embodiment, it should be understood by those skilled in the art that these descriptions are not intended to limit the scope of the invention, and that any modification and variation without departing the spirit of the invention is intended to be covered by the scope of this invention defined only by the appended claims.

What is claimed is:

1. A disc carrier for an optical disc drive, the disc carrier comprising:

a recession integrally formed on the disc carrier;

an axial tube projecting from a central portion of a bottom wall of the recession; and a support member fixed in the recession, the support member including a peripheral support edge along a periphery thereof, the support member being adapted to be in contact with and thus support plural clamping members of a clamping device, wherein the peripheral support edge of the support member includes an inclined face that faces radially inward, each of said plural clamping members of the clamping device including an inclined face in contact with the inclined face of the peripheral support edge, allowing said plural clamping members of the clamping device to slide relative to the support member alone the inclined face of the peripheral support edge of the support member.

2. The disc carrier for an optical disc drive as claimed in claim 1, wherein the support member includes a central hole through which the axial tube of the disc carrier extends.

3. A disc carrier for an optical disc drive, the disc carrier comprising:

a recession integrally formed on the disc carrier;

an axial tube projecting from a central portion of a bottom wall of the recession; and a support member fixed in the recession, the support member including a peripheral support edge along a periphery thereof, the support member being adapted to be in contact with and thus support plural clamping members of a clamping device, wherein the support member includes a central hole through which the axial tube of the disc carrier extends, and wherein the support member further includes an annular groove between the central hole and the peripheral support edge of the support member, allowing stable movement of said plural clamping members of the clamping device.

* * * * *